Apr. 24, 1923.
W. McHEWITT ET AL
1,453,018
TOOL
Filed Jan. 19, 1922
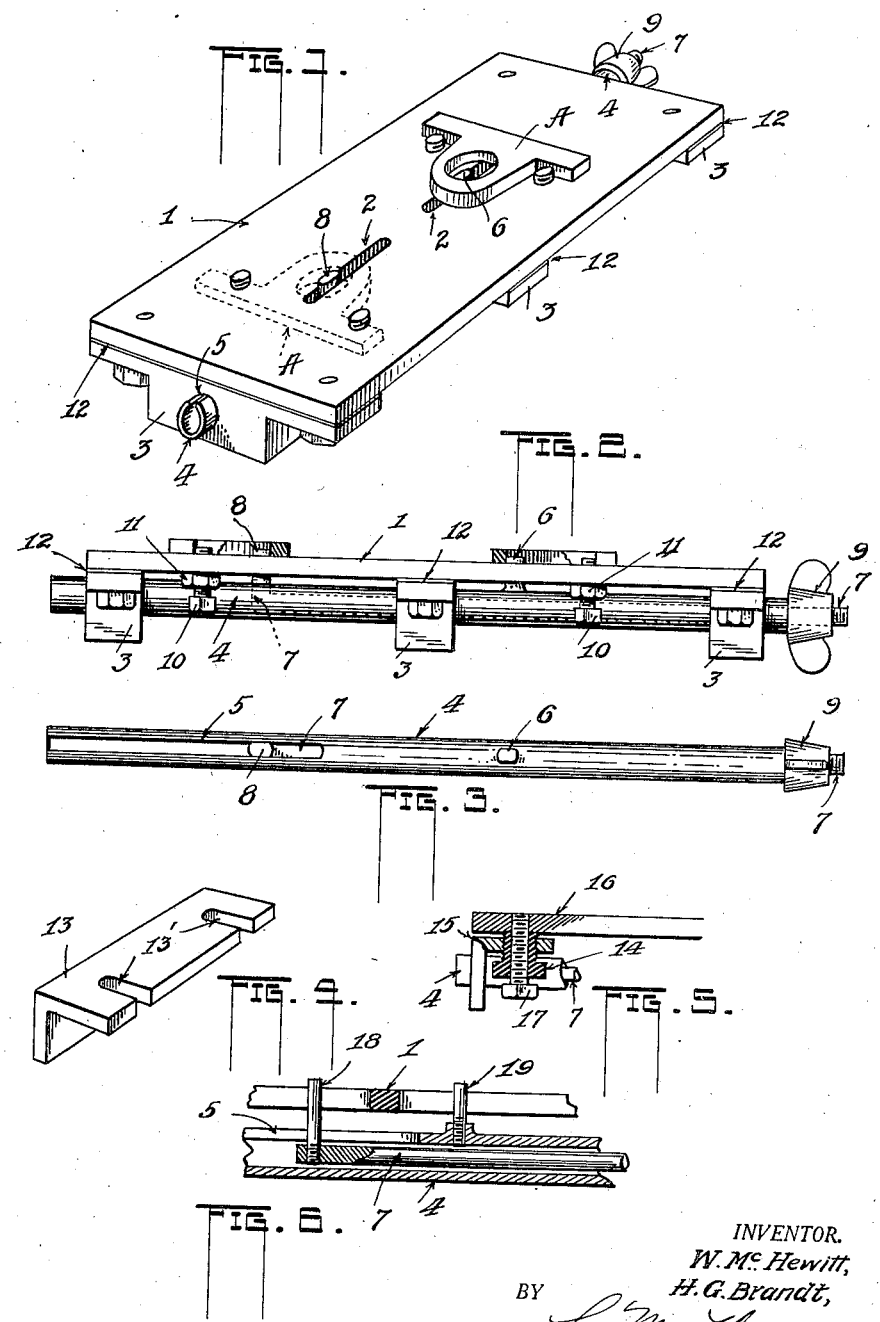
INVENTOR.
W. McHewitt,
H. G. Brandt,
BY
ATTORNEY.

Patented Apr. 24, 1923.

1,453,018

UNITED STATES PATENT OFFICE.

WILLIAM McHEWITT AND HAROLD G. BRANDT, OF BURLINGTON, IOWA.

TOOL.

Application filed January 19, 1922. Serial No. 530,251.

*To all whom it may concern:*

Be it known that we, WILLIAM McHEWITT and HAROLD G. BRANDT, both citizens of the United States, residing at Burlington, in the county of Des Moines and State of Iowa, have invented new and useful Improvements in Tools; and we do hereby declare that the following is a full, clear, and exact description of the invention, which will enable others skilled in the art to which it appertains to make and use the same.

This invention has reference to a tool for holding work to be operated upon.

It pertains to a tool upon which the work may be secured while being machined or while being dressed by a hand file.

The invention has for an object to provide a support having a plane face upon which flat pieces of work may be placed and firmly secured while being dressed.

Another object is that while adaptable for use in clamping any form of work the device of our invention is particularly of advantage in reducing in thickness the so-called "shims" employed between the halves of bearings in engine construction and the like.

It is quite often required to reduce the thickness of a shim in order to provide one that when inserted between the bearing parts will give just the proper working fit for the shaft, crank, or other part in said bearing.

The method commonly used for reducing a shim is that of using a hand file as the easiest and quickest, but it is difficult to properly secure the shim while being operated upon, and extremely difficult to keep its surfaces parallel to one another which is a requisite where a substantial finished job is to be the result.

We have devised a simple but thoroughly efficient tool for this purpose to be described herein, aided by the accompanying drawing forming part hereof, wherein Figure 1 shows a preferred form of the invention in perspective.

Figure 2 is a side elevation of the same.

Figure 3 is a plan of certain parts shown in Figure 2.

Figure 4 shows a modification of a bearing shown in the earlier figures, the same being illustrated in perspective.

Figure 5 is a sectional elevation of a further modification of the same part, and Figure 6 is a longitudinal section of parts of the device shown in the first three figures though of a modified construction.

The numeral 1 designates a plate, or support as we shall term it, having a flat working-surface. Formed in the support are slots 2, which, while they may lie in any desired position, in the present instance are disposed longitudinally of said support and while two of such slots are shown but one may be used, or several of them, depending upon the work to be done or the desires of the user.

Secured to the under side of the support are bearings 3 which lie transversely thereof. These are bored to receive a tube 4 slotted longitudinally at 5, said slot opening toward the support, Figures 1 and 6, so as to lie opposite the slots 2.

Extending from said tube through one of the slots 2 is a post 6, and within the tube is a rod 7 having a portion 8 extending at right angles therefrom through one of the slots as clearly shown in Figure 2. The rod 7 projects from one end of the tube 4 and is threaded to receive a wing-nut 9, for example, adapted to bear against said tube.

10 denotes threaded studs carried in the support, their ends projecting from the working-surface of the same, and held in fixed positions by means of jamb-nuts 11. In the present instance these screws are spaced apart in pairs, each pair lying in a line perpendicular to the line of the slots 2 and for the present purpose also, that of securing a shim in position to be worked upon, are spaced from one another so that the extremities of a shim will engage them as shown in Figure 1, in which figure two shims are shown designated each by the reference letter A, and wherein also, the extension of the rod 7 extends into the hole in the shim and the post 8 of the tube 4 extends into the other, the two shims being oppositely placed with reference to one another.

With this arrangement the wing-nut when turned in the proper direction in bearing against the end of the tube 4 will shift that member to the left in its bearings as viewed in Figure 2, at the same time drawing the rod 7 to the right. In consequence of this action the extension 8 of the rod and the post 6 of the tube will be moved away from their respective studs 10 or in the direction of one another each clamping its shim immovably.

Preferably, we clamp two shims upon the support in order that both will form a support for the file used for reducing their thicknesses. That is to say, if but one shim were worked upon singly the file will too easily tip making a rounding surface instead of a plane face parallel to the flat side resting upon the working-face of the support. But by using the two shims the reduction of both will insure a uniform thickness for each.

Where it is desired to hold some other form of work the arrangement of the parts may be varied. Furthermore, the adjustment of one of the parts 4, 7 need not necessarily result in the movement of the other since they may be separately mounted and operated.

In addition to imparting movement to the parts 6 and 8 an adjustment thereof with respect to the working-surface of the support is likewise desirable together with a like adjustment of the studs 10. This latter direction of adjustment is in order that these members may be extended a greater or less distance from the said working-surface and whereby they may be kept below the surface of the work where the file or other tool will not reach them and for the further purpose being enabled to extend them for some distance or sufficiently to firmly clamp larger and heavier work.

The studs 10 may, of course, since screws, be readily adjusted after loosening the jamb-nuts 11, while the extension 8 and post 6 may be adjusted by moving the tube 4 closer to or farther away from the support. For example, shims of various thicknesses may be interposed between the support and the bearings 3, one of them being indicated at 12 at the several bearings. As a convenient manner of being enabled to quickly insert these shims 12 the bearings which may or may not have another form as shown at 13 in Figure 4 wherein the openings for the set screws that secured them in place may take the form of slots 13′, the shims, of course, being likewise slotted (not shown) so that all may be slipped into position without the removal of said set screws.

As another method, Figure 5 shows a threaded sleeve 14 adapted to be screwed through the bearing denoted at 15 to abut against the support 16, while a set screw 17 is threaded into the sleeve and said support. It is clear that the adjustment of these parts relatively to each other and relatively to the support admits of adjusting the bearings with respect to the support and thereby the tube 4 and rod 7 are adjusted likewise. Or, again, the extension 8 of the rod may take the form of a threaded stud 18, Figure 6, screwed into the rod, and a threaded stud 19 may be screwed into the tube 4. The adjustment of these studs within their respective parts will determine the distance they shall project from the working-surface of the support.

Of course other methods are open for use but the several examples given are types of what may be adopted.

We claim:

1. In a tool of the nature described, the combination of a support having a plane surface, a tubular member beneath the support, bearings secured to the latter in which the said member is slidable in a longitudinal direction, a rod slidable within the member, a right-angled extension on said rod, there being a slot in the member through which the extension projects, there also being a pair of slots in the said support arranged parallel to the member and rod, the extension of the latter projecting through one of the said slots, an extension on the member extending through the other slot, a pair of studs extending from the surface of the support near each slot in the latter, and means to shift the member and rod relatively in opposite directions.

2. In a tool of the nature described, the combination of a support having a plane surface, a tubular member beneath the support, bearings secured to the latter in which the member is longitudinally slidable, a rod slidable longitudinally within the member an extension projecting at right angles from the rod and adjustable therein in the direction of its length, the member being open along its side, the extension projecting therethrough, there being a pair of slots in the support parallel to the member and rod, the said extension projecting through one of them, an extension on the member adjustable therein and extending through the other slot, a pair of studs extending from the support near each slot, and means to simultaneously shift the member and rod relatively in opposite directions.

In testimony whereof we affix our signatures in presence of two witnesses.

WILLIAM McHEWITT.
HAROLD G. BRANDT.

Witnesses:
 FRED SHEAGREN,
 TIM VAHLE.